United States Patent [19]

Hodgson et al.

[11] Patent Number: 4,969,632

[45] Date of Patent: Nov. 13, 1990

[54] MOUNT WITH ADJUSTABLE LENGTH INERTIA TRACK

[75] Inventors: Douglas A. Hodgson, Cary; Theodore G. Duclos, Raleigh, both of N.C.

[73] Assignee: Lord Corporation, Erie, Pa.

[21] Appl. No.: 392,089

[22] Filed: Aug. 10, 1989

[51] Int. Cl.[5] .......................... F16F 13/00; F16M 5/00
[52] U.S. Cl. ................................. 267/140.1; 267/219
[58] Field of Search .................... 267/140.1, 219, 220, 267/141.2–141.7; 188/267, 268, 320; 248/550, 636, 638, 562; 180/300, 312, 902

[56] References Cited

U.S. PATENT DOCUMENTS

| | | |
|---|---|---|
| 4,262,886 | 4/1981 | Le Salver et al. |
| 4,458,888 | 7/1984 | Wolf et al. |
| 4,583,723 | 4/1986 | Ozawa . |
| 4,641,808 | 2/1987 | Flower ............................ 267/140.1 |
| 4,681,306 | 7/1987 | Hofmann et al. ............... 267/220 X |
| 4,699,099 | 10/1987 | Arai et al. ..................... 267/140.1 X |
| 4,709,779 | 12/1987 | Takehara ..................... 267/140.1 X |
| 4,712,777 | 12/1987 | Miller . |
| 4,720,087 | 1/1988 | Duclos et al. |
| 4,733,758 | 3/1988 | Duclos et al. |
| 4,738,434 | 4/1988 | Marjoram et al. |
| 4,738,435 | 4/1988 | Flower et al. |
| 4,759,534 | 7/1988 | Härtel .............................. 267/140.1 |
| 4,805,884 | 2/1989 | Jordens et al. .................... 267/140.1 |
| 4,811,919 | 3/1989 | Jones . |
| 4,834,349 | 5/1989 | Arai et al. ........................ 180/312 X |
| 4,836,512 | 6/1989 | Lun ................................... 267/140.1 |
| 4,836,515 | 6/1989 | Franz et al. ................... 267/140.1 X |
| 4,840,358 | 6/1989 | Hoying et al. ................... 267/140.1 |
| 4,877,225 | 10/1989 | Noguchi et al. ................. 267/140.1 |
| 4,886,252 | 12/1989 | Haussermann . |

FOREIGN PATENT DOCUMENTS 2186052 8/1987 United Kingdom .

OTHER PUBLICATIONS

B. M. Patel, G. E. Warnaka, and D. J. Mead, "New Structural Damping Technique for Vibration Control," Lord Library of Technical Articles, Report no. LL-6000 (1978).

E. J. Krasnicki, "Comparison of Analytical and Experimental Results for a Semi-Active Vibration Isolator," Lord Library of Technical Articles, Report No. LL-2139 (1980).

E. J. Krasnicki, "The Experimental Performance of an 'On-Off' Active Damper," Lord Library of Technical Articles, Report No. LL-2140 (1981).

W. C. Flower, "Understanding Hydraulic Mounts for Improved Vehicle Noise, Vibration and Ride Qualities," Lord Library of Technical Articles, Report No. LL-2166 (1985).

L. R. Miller, "An Introduction to Semi-Active Suspension Systems," Lord Library of Technical Articles, Report No. LL-1204 (1986).

Primary Examiner—Douglas C. Butler
Attorney, Agent, or Firm—David L. McCombs; James W. Wright

[57] ABSTRACT

The fluid inertia mount of the like has an inertia track with an adjustable fluid path length located between variable volume fluid chambers of the mount. By adjusting the fluid path length of the inertia track the mount may be dynamically tuned continuously between a range of frequencies in a manner to provide a low stiffness notch for isolating input excitations that produce undesirable vehicle vibrations. A tuning plate assembly adjustably locates an opening of the inertia track in a desired location along the length thereof betwene extreme positions in which the fluid path length is relatively long and relatively short.

8 Claims, 2 Drawing Sheets

MOUNT WITH ADJUSTABLE LENGTH INERTIA TRACK

FIELD OF THE INVENTION

The present invention relates in general to dynamic vibration attenuating fluid mounts and similar devices that generate fluid inertia forces for significantly altering mount operating characteristics at particular excitation frequencies. More specifically, the invention relates to an improved inertia type mount having an adjustable length inertia track by means of which the mount may be dynamically tuned within a selected range of excitation frequencies to effect abrupt changes in the dynamic stiffness of the mount.

BACKGROUND OF THE INVENTION

Significant improvements in the performance of production automobiles and other vehicles have been achieved by the provision of hydraulic mounts for the dampening of shocks and/or other vibrations. Standard hydraulic mounts used for these and other applications typically have interconnected variable volume chambers between which hydraulic fluid passes during excitation of the mount. One or both of the variable volume chambers is bounded by a compliant member which functions to carry the static and dynamic load on the mount and, also functions as a piston to "pump" the hydraulic fluid between the opposing chambers. Resistance of the fluid to flow between the chambers opposes and damps vibratory and similar forces imposed upon the mount, and in conjunction with other factors, provides for reliable and precise dynamic stiffness characteristics.

More versatile fluid mounts have been developed which utilize fluid inertia forces to achieve and/or to enhance the desired attenuation of vibratory forces. So-called "inertia augmented" damping is provided by hydraulic mounts which include a tube or "inertia track" which confines and directs fluid between the upper and lower variable volume chambers of the mount. Oscillation of the liquid within the inertia track offers an "inertence" or mass-like resistance to the compliant member pumping forces, which is in phase with input disturbance displacement and opposite in direction to input acceleration. The inertial forces of the oscillating fluid reduce the dynamic stiffness of the mount at some particular frequency of input excitation Illustratively, a plot of the dynamic stiffness against the excitation frequency of mounts of the fluid inertia type typically include a "notch-like" region at which the dynamic stiffness of the mount is greatly reduced and may be considerably less than its static stiffness, followed by a "peak" of large dynamic stiffness (FIG. 1). A mount may be so designed to cause the foregoing abrupt reduction in its dynamic stiffness (hereinafter referred to as the low stiffness "notch") to occur at a particular excitation frequency $f_o$ where a particular vibration problem exists. For example, in many automotive applications, excessive mount stiffness can result in transmission of vibration to the automobile frame and vehicle interior. Such objectionable vibration may be caused by engine firing vibrations generated at a particular engine speed and may be substantially eliminated by the use of an inertia type engine mount that is specifically designed so as to possess its minimum or low stiffness notch at the frequency of the aforesaid vibrations.

While the predesignated selection of the low stiffness notch for an inertia type mount may be adequate for the isolation of input excitations occurring at one particular frequency, problem vibrations such as those producing undesirable vehicle vibrations may occur at a number of significantly different engine speeds and mount excitation frequencies. It is therefore desirable for an inertia type mount to be readily adjustable or dynamically tunable, so as to permit selective variation during mount operation of the frequencies at which the mount has very low dynamic stiffness.

A well accepted method for providing an inertia type mount which is to some extent dynamically tunable is to provide a means for varying the flow path cross sectional area (A) of the inertia track. The input frequency at which the low stiffness notch occurs, and the "depth" of the notch is a function of, among other things, the fluid inertia ($I_f$) and the fluid resistance in the inertia track ($R_f$). Since the magnitude of the inertia which produces the low stiffness notch varies as a function of the cross-sectional area of the inertia track, immediate and controllable adjustments to the fluid flow cross-sectional area through the inertia track can be used to shift the notch on the dynamic stiffness curve to a desired frequency. Known mounts of this type provide for relatively complicated valves having a variable orifice size. Other devices contain a plurality of flow passageways between the chambers, which function in parallel and are selectively opened or closed to vary the overall cross sectional flow area between the chambers. For example, see U.S. Pat. No. 4,641,808 and U.S. Pat. No 4,733,758.

A shortcoming associated with dynamically tuned, inertia type fluid mounts of the foregoing type is that large resistances to fluid flow generated within the inertia track caused by a substantial reduction in the flow path cross sectional area can greatly diminish the depth of, if not altogether eliminate, the low stiffness notch and thus its effects upon the mount operating characteristics. The depth of the notch is a strong function of the resistance to fluid flow divided by the fluid inertia within the inertia track ($R_f/I_f$), such that a low value for ($R_f/I_f$) will produce a low notch stiffness and, thus, a preferred "deeper" notch. It is accepted that resistance to fluid flow ($R_f$) in an inertia track is proportional to one over the square of the area ($1/A^2$), while the inertia is proportional to one over the area ($1/A$). Accordingly, $R_f/I_f$ will significantly increase (adversely diminishing the notch depth) as the cross sectional area (A) is made smaller. The notch depth is therefore very sensitive to changes in the cross sectional area of the inertia track because of the second order relationship between the cross-sectional area and resistance.

In contrast, the length of the inertia track (L) is proportional both to the inertia ($I_f$) and resistance ($R_f$) such that changes in the length do not produce the same adverse effect on the value of $R_f/I_f$. Since the resistance and inertia within the inertia track both vary linearly with its length, immediate and controlled adjustments to the length thereof would not as dramatically affect the depth of the notch (that is, increase the dynamic stiffness at the notch or notch stiffness) to the same extent as adjustments to the flow path cross sectional area. For this reason a mount in which the length of the inertia track is adjusted as opposed to the cross sectional area in order to change the mount operating frequency at which the notch occurs will have superior performance over a wider range of frequency values.

It may, therefore, be desirable to dynamically tune an inertia type mount by adjustment of the length of the inertia track instead of its cross sectional area in order to select the frequency at which the low stiffness notch can be utilized to avoid undesirable vibrations.

SUMMARY OF THE INVENTION

It is therefore an object of the present invention to provide a fluid mount with inertia augmented damping which has improved dynamic stiffness characteristics over existing fluid mounts.

It is a further object of the present invention to provide a mount of the above type in which the mount operating characteristics may be dynamically tuned.

It is a more specific object of the present invention to provide a mount of the above type in which dynamic tuning of the mount is accomplished by adjusting the fluid path length of an inertia track.

It is a still further object of the present invention to provide a mount of the above type in which the reduced stiffness "notch" can be selected to occur over a continuous range of operating frequencies.

It is a still further object of the present invention to provide a mount of the above type in which the sensitivity of the low stiffness notch dept with frequency is minimized.

Towards the fulfillment of these and other objects, a hydraulic mount is provided which may be dynamically tuned continuously between a range of frequencies in a manner to provide a low stiffness notch for isolation of input excitations that produce undesirable vehicle vibrations. The mount is tuned in the foregoing regard by the provision of an adjustable length inertia track located between variable volume chambers of the mount.

The inertia track is defined in part by a cooperable tuning plate assembly that serves to adjustably locate the opening of the inertia track to one of the variable volume chambers in a desired location along the length of the inertia track, in a manner to select the fluid path length of the inertia track. The inertia track is operable between extreme positions in which its fluid path length is respectively relatively long and relatively short. The tuning plate is driven by an electric motor and made to be controllable by computer or other means in response to the dynamic conditions experienced by the mount.

DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figure 1:
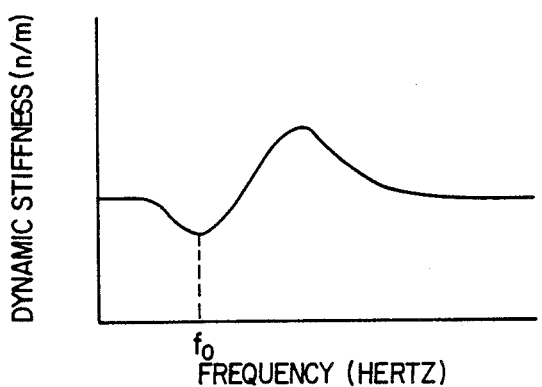
FIG. 1 is a graphical representation of the relationship between dynamic stiffness and excitation frequency of a vibration isolating device in which fluid inertia augmented damping is realized.

FIG. 1 shows the relationship between dynamic stiffness and excitation frequency for vibration isolating devices, generally, in which fluid inertia augmented damping is realized.

Figure 2:
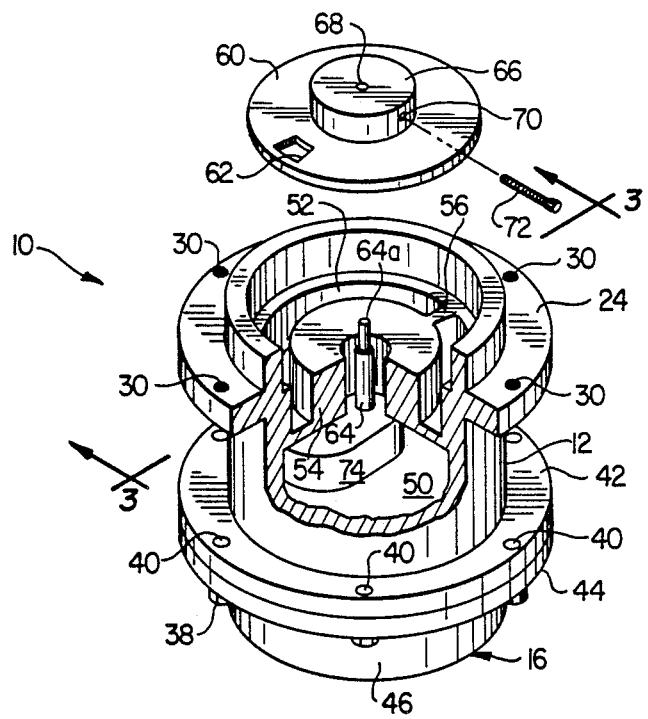
FIG. 2 is an exploded, partially broken away perspective view of a fluid mount of the present invention.
Figure 3:
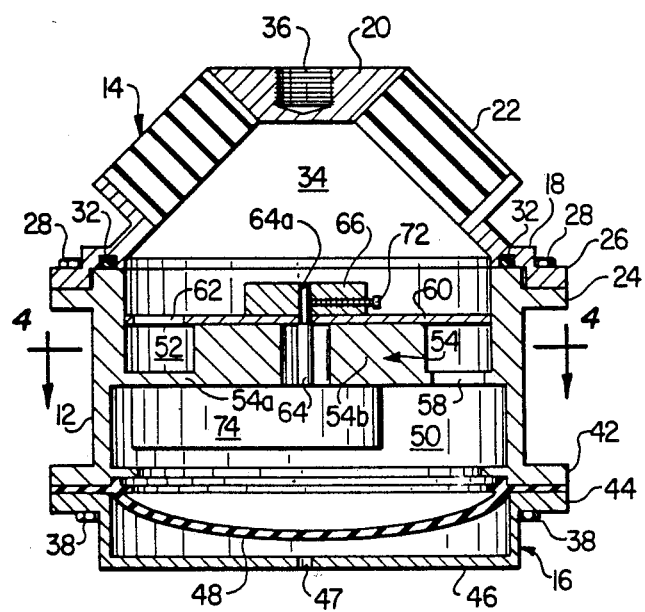
FIG. 3 is an enlarged, vertical cross-sectional view of the mount of the present invention taken along line 3—3 of FIG. 2.

Referring to FIGS. 2 and 3 of the drawings, there is designated by reference numeral 10 a fluid mount or similar device of the type generating fluid inertia forces for attenuating the transmission of vibrations and/or shock forces between relatively movable vibration transmitting and receiving members (not shown), such as the engine and frame components of an automobile or other vehicle. The mount 10 includes a rigid central housing 12, a top compliance assembly 14 and a bottom compliance assembly 16. For the purpose of clarity in illustrating the subsequently described internal components of the housing 12, the top compliance assembly 14 has been removed and is not shown in FIG. 2.

The top compliance assembly 14 as illustrated in FIG. 3 includes a rigid base 18 and rigid upper element 20. The base 18 and the element 20 are interconnected for vertical movement relative to each other by a resilient spring-like elastomeric element 22 of generally frusto-conical shape. The housing 12 and the top compliance assembly 14 are secured one to the other along respective peripheral flanges 24, 26 thereof by suitable fasteners 28 such as bolts or the like extending into corresponding bores 30 of the flanges. A sealing member 32 is positioned between the housing 12 and the top compliance assembly 14 to prevent leakage of fluid therefrom at their mating surfaces.

The housing 12 and the top compliance assembly 14 define an upper, variable volume fluid chamber 34, the capacity of which is decreased and increased by relative movement of the base 18 and the upper element 20 towards and away from each other. The housing 12 is adapted to be connected by means (not shown) to one of the two members interconnected by the mount (also not shown). The upper element 20 of the top compliance assembly 14 is similarly adapted to be connected, as for example by its illustrated threaded bore 36, to the other of such members.

The bottom compliance assembly 16 is connected to the housing 12 in a manner similar to that of the top compliance assembly 14. Fasteners 38 extend through corresponding bores 40 (FIG. 2) of respective mating flanges 42 and 44 of the housing 12 and the bottom compliance assembly 16. The bottom compliance assembly 16 includes a rigid end cap 46 and a resilient, flexible diaphragm 48 made of elastomer or similar material. The periphery of diaphragm 48 is clamped in a fluid-tight manner between the bolted together peripheral flanges 42 and 44. The space between the diaphragm 48 and the inner surfaces of the housing 12 defines a second or lower variable volume fluid chamber 50 that is interconnected with the upper chamber 34 through the housing 12 in a manner to be described. The cap 46 has an opening 47 within its lower wall to facilitate the movement of diaphragm 48 within the cap.

Although not shown in the drawings, the housing 12 and the upper and lower chambers 34 and 50 are substantially filled with a hydraulic fluid such as water, and/or glycol, alcohol or the like.

Figure 4:
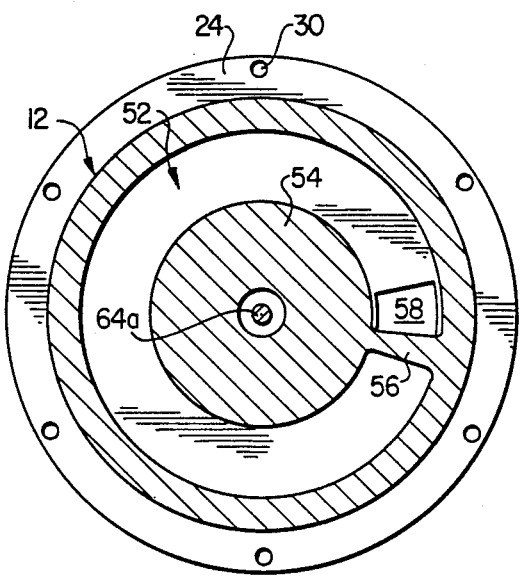
FIG. 4 is an enlarged, overhead cross-sectional view of the mount of the present invention taken along line 4—4 of FIG. 3 showing the inertia track of the present invention.

Referring now also to FIG. 4 of the drawings, the housing 12 includes an adjustable length passage or inertia track 52 that extends in a generally circular fashion about the inner periphery of the housing. The inertia track 52 is defined at the sides and bottom thereof by a base assembly 54 including a disc-like member 54a centered in the housing 12 and an annular web or plate 54b connecting the member 54a to the inner wall of the housing. Each end of the track 52 is defined by a partition 56 extending between the base member 54a and the inner wall of the housing. An opening 58 in the plate 54b adjacent to the partition 56 is in fluid communication with the lower chamber 50.

A tuning plate 60 defines the top of the inertia track 52. An opening 62 is included within the tuning plate 60 for communication with the upper chamber 34. A spindle 64 is positioned within a central bore of the base member 54a and engages the tuning plate 60. As will be subsequently discussed, the tuning plate 60 is rotatable about the axis of the spindle 6 for adjusting the length of the inertia track 52. A central hub 66 is attached to or formed contiguously with the tuning plate 60 and includes a longitudinal bore 68 (FIG. 2) for receiving a reduced diameter portion 64a of the spindle 64. A lateral, threaded bore 70 (FIG. 2) and a set screw 72 are included within the hub 66 for securing the tuning plate 60 tightly to the spindle portion 64a in a manner to prevent "slippage" during rotational motion of the spindle and tuning plate arrangement.

A casing 74 is secured to the bottom of the base structure 54 and includes therein an electric motor (not shown). The motor is connected by a suitable gear reduction assembly (also not shown) to the spindle 64 and provides for rotation of the spindle (and hence the attached tuning plate 60) in either direction. The casing 74 protects the enclosed motor and gear reduction assembly from fluid damage during operation of the mount 10. Although not shown in the drawings, a source of power is connected to the motor by suitable wiring (also not shown) for driving the motor.

It is noted that since fluid enters and leaves the inertia track 52 at one end through the fixed opening 58 and at the other end through the movable opening 62, the effective fluid path length of the inertia track is variable and determined by the position of the opening 62 over the inertia track 54.

During operation, excitation of the mount 10 as a result of movement of the base 18 and upper element 20 toward and away from each other causes alternating increases and decreases in fluid pressure between the upper and lower chambers 34, 50. To equalize the fluid pressure differentials within the mount 10, fluid will have a tendency to flow between the upper and lower chambers 34 and 5 through the inertia track 52, the length of which is variable by rotation of the plate 60 relative to the assembly 54.

Figure 5:
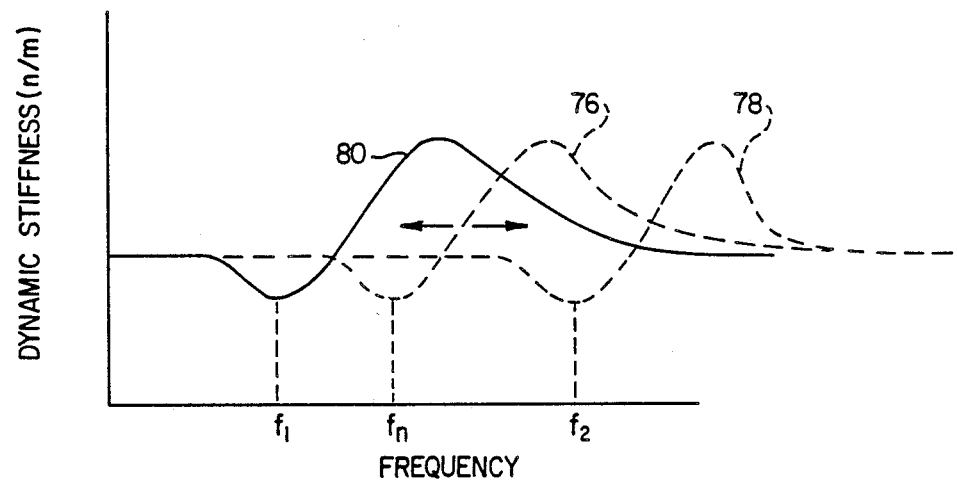
FIG. 5 is a graphical representation of the relationship between dynamic stiffness and frequency for the mount of the present invention operating between a condition in which the fluid path length of the inertia track is at its greatest to produce a low stiffness notch at frequency $f_1$, and a condition in which the length of the inertia track is at a minimum producing a low stiffness notch at frequency $f_2$.

As illustrated in FIG. 5, there is shown a dashed line curve 76 showing the relationship between dynamic stiffness and frequency that may be experienced during operation of the mount 10 having the inertia track 52 which is adjustable in its fluid path length. At a particular frequency ($f_n$) the movement of fluid within the inertia track 52 generates inertia forces causing the dynamic stiffness of the mount to be of a reduced magnitude, which may be and illustratively is lower than the static stiffness of the mount. This low stiffness "notch" in curve 76 is followed at a slightly higher frequency by a high stiffness "peak" in the mounts dynamic stiffness. The particular frequency ($f_n$) at which the foregoing occurs is dependent upon a number of factors that include the dimensions of the inertia track 52, the area of the upper and lower chambers 34, 50 of mount 10, the compliance of the upper and lower chambers, the density and viscosity of the fluid within the mount, etc. Importantly, the frequency ($f_n$) at which the low stiffness notch occurs is also dependent on the fluid path length of the inertia track and may be selected within a variable range of frequencies. Rotation of tuning plate 60 selectively positions the opening 62 over a desired region of the inertia track 52 thereby adjusting its fluid path length.

The fluid path length of the inertia track 52 of the present invention is continuously adjustable between two extremes. For example, when the opening 62 of the tuning plate 60 is oriented substantially over the opening 58 within the base structure 54, the inertia track 52 is relatively "short" in its fluid path length. This condition is illustrated by curve 78 in FIG. 5. The low stiffness notch of curve 78 occurs at a maximum frequency ($f_2$). Alternatively, when the tuning plate 60 is rotated all the way about the mount 10 so that opening 62 is located on the other side of the partition 56, the fluid path of the inertia track 52 is at its maximum length since the fluid traveling between the openings 58 and 62 must travel the substantial length of the inertia track. This condition is represented by curve 80 of FIG. 5, in which the low stiffness notch occurs at a minimum frequency of $f_1$. It is understood that by actuation of the motor within the casing 74, the spindle 64 can be utilized to rotate the tuning plate 60 and orient the opening 62 over any location of the inertia track 52 between the above described extremes to adjust the fluid path length of the inertia track according to the input vibration to be controlled. As represented by curve 76, the low stiffness notch $f_n$ may be continuously positioned in response to a control condition at any location between the extremes previously discussed.

Figure 6:
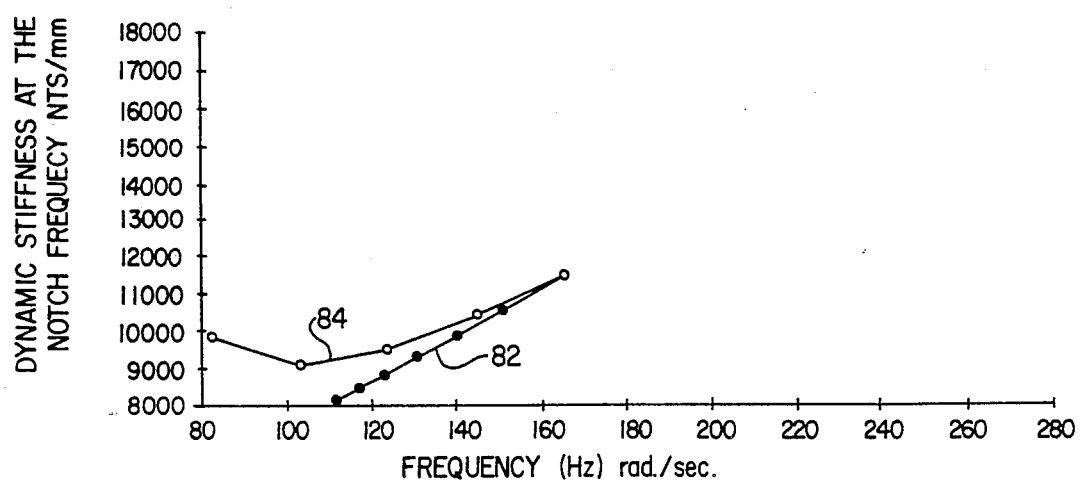
FIG. 6 is a graphical representation of the relationship between dynamic stiffness at the low stiffness notch and notch frequency for a mount of the present invention in which the low stiffness notch frequency is determined by the length of the inertia track, and for a mount of the prior art in which the low stiffness notch frequency is determined by adjustment of the cross-sectional area of the inertia track.

An advantage of providing inertia augmented damping by adjustment of the fluid path length of an inertia track is illustrated in FIG. 6. A graphical representation showing the relationship between dynamic stiffness at the notch and notch frequency is depicted for two cases. Curve 82 represents the "depth" of the notch for various notch frequencies of a mount having an adjustable length inertia track. In contrast, curve 84 shows the "depth" of the low stiffness notch for a prior art mount which is dynamically tuned by adjustment of the cross-sectional area of the inertia track. It is apparent that in curve 84, the depth of the lowest stiffness notch is degraded; that is, dynamic stiffness at the notch is relatively high thereby making the depth of the notch less pronounced in the lower frequency ranges of, for example, less than 150 Hertz.

Figure 7:
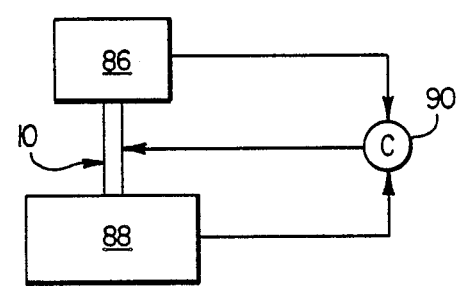
FIG. 7 is a schematic representation of the mount in association with supported and supporting members and control components.

FIG. 7 is a diagrammatic illustration of the mount 10 of the present invention as connected to engine and/or frame components 86, 88 of a vehicle or the like. The motor within casing 74 (FIGS. 2 and 3) is actuated to rotate the tuning plate 60 selectively by suitable power generating means (not shown) and controlled by a computer 90 or similar controller receiving input signals from sensors (also not shown) associated with the engine 86 and/or frame 88, as well as from other sources such as an internal program or other means. The system enables the mount 10 to be dynamically tuned during operation of the vehicle so as to achieve conditions of either minimum or maximum dynamic stiffness at any of the differing frequencies of excitation of the mount.

Although not specifically illustrated in the drawings, it is understood that other additional and necessary equipment and structural components will be provided, and that these and all of the components described above are arranged and supported in an operative fashion to form a complete and operative system.

It is also understood that variations may be made in the present invention without departing from the spirit and scope of the invention. Although illustrative embodiments of the invention have been shown and described, other modifications, changes and substitutions are intended in the foregoing disclosure. In certain instances some features of the invention will be employed without a corresponding use of other features. Accordingly, it is appropriate that the appended claims be construed broadly and in a manner consistent with the scope of the invention.

What is claimed is:

1. A fluid inertia mount comprising a housing formed in part of resilient material and defining at least one variable volume chamber containing a fluid, stationary means defining an annular inertia track passage within said housing for permitting fluid to flow into and from said chamber to generate inertia forces effecting a change in the dynamic stiffness of the mount at certain excitation frequencies, said passage having first and second ends separated by a partition, and means for adjustably varying the fluid flow path length of said inertia track passage over the full annular length of said passage for varying the frequencies at which said change in the dynamic stiffness of the mount occurs, said means for varying the fluid flow path length of said inertia track passage including a rotatable tuning plate overlying said inertia track passage and having an opening therein, the fluid flow path length thereof being determined by the rotational position of said opening relative to said passage, and means for imparting adjustive rotational movement to said tuning plate.

2. A fluid inertia mount according to claim 1 wherein said adjustive means comprises a motor.

3. A fluid inertia mount of claim 1, wherein said means for imparting adjustive movement to said tuning plate is continuously variable.

4. A fluid inertia mount according to claim 1 further comprising control means for selecting the fluid flow path length of said inertia track passage in response to input disturbances or vibrations associated with the mount.

5. A fluid inertia mount according to claim 1 comprising two variable volume chambers interconnected by said inertia track passage.

6. A vibration attenuating mount of the fluid inertia type comprising housing means formed in part of resilient material having a rigid central section and defining first and second chambers, said section including a stationary cylindrical wall, a central base member and a web connecting said member to said wall to define an annular inertia track fluid passage, a partition between said member and said wall defining first and second ends of said passage, a first opening extending through said web adjacent to said partition, and a rotatable tuning plate having a second opening therein and overlying said member and said passage, such that the distance between said first and second openings along said passage determines the fluid flow path length of said passage and said fluid passing between said chambers through said passage experiences inertia forces effecting a change in the dynamic stiffness of said mount at certain excitation frequencies according to said fluid flow path length, and means for rotating said tuning plate to continuously adjust the rotational position of said second opening for varying said fluid flow path length and thus the dynamic stiffness characteristics of said mount.

7. An apparatus according to claim 6 wherein said means for rotating said tuning plate comprises a motor secured to said base member within one of said first and second chambers, and a spindle extending from said motor through said member for connection to said plate.

8. An apparatus according to claim 7 wherein said tuning plate includes a central hub for supporting said spindle.

* * * * *

UNITED STATES PATENT AND TRADEMARK OFFICE
CERTIFICATE OF CORRECTION

PATENT NO. : 4,969,632

DATED : November 13, 1990

INVENTOR(S) : Hodgson et al.

It is certified that error appears in the above-identified patent and that said Letters Patent is hereby corrected as shown below:

<u>IN THE ABSTRACT</u>

Line 1, change "of the like" to --or the like--.

Line 11, change "betwene" to --between--.

Col. 1, line 49, change "excitation" to --excitation.--.

Col. 3, line 25, change "dept" to --depth--.

Col. 5, line 32, change "the spindle 6" to --the spindle 64--.

Col. 5, line 66, change "34 and 5" to --34 and 50--.

Signed and Sealed this

Eighteenth Day of August, 1992

Attest:

DOUGLAS B. COMER

*Attesting Officer*  *Acting Commissioner of Patents and Trademarks*